United States Patent [19]
Davis et al.

[11] Patent Number: 5,921,937
[45] Date of Patent: Jul. 13, 1999

[54] METHOD AND SYSTEM FOR EXTRACTION AND DETECTION OF PHYSIOLOGICAL FEATURES

[76] Inventors: Dennis W. Davis, 207 E. Woodward Ave., Eustis, Fla. 32726; Jaime R. Román, 2250 Quail Ridge, Palm Beach Gardens, Fla. 33418; James H. Michels, 2 University Dr., Clinton, N.Y. 13323

[21] Appl. No.: 09/119,927

[22] Filed: Jul. 21, 1998

Related U.S. Application Data

[62] Division of application No. 08/827,032, Mar. 25, 1997, Pat. No. 5,810,014.

[51] Int. Cl.⁶ .................................................. A61B 5/00
[52] U.S. Cl. ............................................................ 600/508
[58] Field of Search ...................... 128/920, 923, 128/924; 600/508, 509, 515, 481, 300

[56] References Cited

U.S. PATENT DOCUMENTS 5,020,540  6/1991  Chamoun ................................ 600/509
5,390,679  2/1995  Martin ..................................... 600/481

*Primary Examiner*—William E. Kamm
*Assistant Examiner*—George R. Evanisko

[57] ABSTRACT

The invention is directed to a method and associated system for the detection of various physiological features in multi-channel sensor data. Truth data organized in the form of a vector sequence is used to generate a multichannel state variable model for data that is known to lack physiological features of interest. Such state variable models are obtained using one or more of a host of system identification algorithms. Upon identification of the model parameters, a multichannel inverse filter is derived from the model parameters. The inverse filter can be used to whiten or decorrelate components of sensor data sequences that are not associated with the physiological features of interest. The unwhitened output of the inverse filter then represents the physiological features of interest that can be extracted from the concomitant white noise. On this basis, a number of such filters can be produced for a variety of undesired physiological feature components of the data that occur separately or in combination. The invention is useful for the extraction of known and unknown features of interest from multichannel physiological sensor data.

10 Claims, 3 Drawing Sheets

METHOD AND SYSTEM FOR EXTRACTION AND DETECTION OF PHYSIOLOGICAL FEATURES

This is a division of Ser. No. 08/827,032, filed Mar. 25, 1997, now U.S. Pat. No. 5,810,014.

STATEMENT OF GOVERNMENT INTEREST

The invention described herein may be manufactured and used by the United States Air Force for governmental purposes without the payment of any royalties thereon.

BACKGROUND—FIELD OF THE INVENTION

The invention is directed to a method and system for the detection of various physiological conditions using multichannel sensor data. The invention is also directed to the extraction of known and unknown features from multichannel physiological sensor data.

BACKGROUND—DESCRIPTION OF THE PRIOR ART

The use of signal processing technology for the detection and assessment of physiological abnormalities present in various sensor signals is well established in the prior art. In fact, considerable effort to achieve the automated detection of physiological abnormalities using sensor data has been expended in such fields as cardiology. This task has been attempted by many investigators with varying degrees of success.

The exploitation of cross-channel information present in multi-sensor systems by signal processing modalities has been addressed only recently in the field of biomedicine. A model-based multichannel approach to the detection of physiological process signatures, as disclosed herein, offers the prospect of improved performance over conventional techniques.

The signals obtained from physiological sources often exhibit complex structure that reflects the nature of the processes being sensed. For example, in the cardiovascular system the complexity of the heart itself leads to the potential for a great number of pathologies. In the case of electrocardiogram (ECG) sensing, these pathologies are evidenced by either abnormal wave morphology, abnormal rhythm, or combinations of both. Conventional algorithmic approaches to abnormality detection and classification using ECGs have been largely rule-based and heuristic schemes (J. L. Willems, "Common Standards for Quantitative Electrocardiography—10th and Final Progress Report," CSE Coord Ctr report 1990, Div of Medical Informatics, Univ Hospital Gasthuisberg, Leuven, Belgium). These methods use various combinations of parameters derived from various combinations of ECG leads (channels).

With respect to feature extraction, there are numerous features of physiological significance that are obscured by large non-feature signal behavior, signal complexity, or noise. Examples of cardiac pathologies that exhibit features difficult to detect include ventricular late potentials and electrical alternans. Examples of low-level signatures that are due to normal physiology include His bundle electrical activity and the "U" wave portion of the ECG, the origin of which remains unidentified. Improvements in sensing and processing of cardiac signals may allow discovery of yet other features of physiological origin that have been heretofore undetectable.

Prior art means of detecting weak signatures in periodic physiological waveforms such as the ECG have traditionally included signal averaging over numerous cycles of the waveform and spectral filtering. Signal averaging requires tremendous accuracy in the segmentation of the data sequence of interest from successive cardiac cycles and and spectral filtering is often inadequate for separating signal features that have significant spectral overlap. Cross-channel information can provide the margin required to achieve these processing goals. From the advent of multilead ECGs, the expert system of the physician's mind has made use of cross-channel information in the diagnosis of cardiac conditions. However, only recently has the cross-channel information sought to be exploited in the signal processing domain to improve detection of such weak signals. An example is U.S. Pat. No. 5,560,367 to Haardt et al. The method of this invention first creates a data matrix from temporal sequences of multilead ECG signals and performs a singular value decomposition (SVD) of this data matrix. Subsequently, singular values that are below a threshold are replaced by zeros. Further calculations using the SVD factors provide a high-resolution spectral analysis of the ECG waveform that can detect ventricular late potentials in a single cardiac cycle. U.S. Pat. No. 5,474,078 to Hutson discloses another subspace-based approach to the detection of low-level ECG features such as alternans and ventricular late potentials. Again, a large data matrix is constructed from multichannel temporal sequences of data. The SVD of this matrix provides the singular vectors among the factors. Those singular vectors associated with singular values of decreasing magnitude are shown to provide waveform features of decreasing power. In this way, such features as respiration artifact, alternans, and ventricular late potentials can be identified as present in the original data.

Another recent processing paradigm that has been widely applied and provides implicit use of cross-channel information is that of neural networks. With regard to biomedical applications, neural networks have been applied to the recognition of patterns in sensor data indicative of physiologic status. U.S. Pat. No. 5,251,626 to Nichols et al. discloses use of various neural networks in a hierarchical architecture for the purpose of classifying individual ECG waveforms and, at a higher level, diagnosing cardiac arrhythmias. The classification of multichannel electrophysiological patterns by a neural network classifier is the subject of U.S. Pat. No. 5,417,211 to Abraham-Fuchs et al. A neural network pattern analyzer is at the center of a system for monitoring electroencephalographic activity that is used to control a computer as disclosed in U.S. Pat. No. 5,447,166 to Gevins.

The presently disclosed invention makes use of state variable models in a scheme for the detection of abnormalities and features in physiological signals. Model-based, multichannel processing of this type offers good performance without the need for the large amount of truth (training) data required by neural network-based approaches. This invention has wide applicability to innumerable forms of physiological signals containing features with significant temporal and spectral overlap. This is in contrast to the subspace-based approach of U.S. Pat. No. 5,560,367 referred to earlier. The inventors are unaware of any application of model-based, multichannel state variable formulations to the problem of physiological abnormality detection.

SUMMARY OF THE INVENTION

In a preferred embodiment of the invention for detection of specific physiological conditions, the processing system of the present invention is used with a multichannel sensor such as an ECG system. Also, a variety of sensors can be used in concert; in addition to the ECG, these include phonoacoustic, magnetocardiographic, and others. The invention does not place constraints on the placement of individual sensors or the type of sensor employed.

The sensor data is organized as a vector sequence, each element of the vector corresponding to a particular sensor (or channel) and each index in the sequence corresponding to a time sample. It is within the scope of the presently disclosed invention to include imaging sensors wherein each pixel of such a sensor constitutes an element of the data vector and each image frame constitutes a time sample.

In the example of the ECG sensor, the input data, representative of a particular cardiac abnormality or condition, is pre-processed to segment the data in order to extract portions of the signal that are of diagnostic significance, remove trends that are unrelated to the cardiac signal, such as sensor bias and baseline drift, and normalize the ECG time sequences for each channel. The normalization of the data removes from consideration the extraneous amplitude variability between channels and different data sets that is due to data collection conditions.

The pre-processed multichannel data is treated as the output of a multichannel state space system that is to be identified. Various options exist for the algorithms that will identify the model parameters (matrix coefficients) of a state variable equation model for such a system. The selection of the algorithm depends upon the assumed nature of the model and the way in which the data is to be processed to identify the model parameters. Two major types of models are a deterministic system driven by impulse signals and a stochastic system driven by white noise. In addition, algorithms exist that can identify model parameters by either operating on the data sequence directly or by processing the covariance sequence derived from the data sequence.

Upon identification of the model parameters, a multichannel inverse filter is derived from the model parameters. The inverse filter can be used to "whiten" (decorrelate) sensor data sequences that are associated with various physiological abnormalities. The degree of whitening is a measure of the match of an unknown physiological condition with that physiological abnormality represented by the data used to generate the filter. On this basis, a number of such filters can be produced for a variety of physiological conditions. In the preferred embodiment, these filters operate in parallel on a given multichannel data sequence that represents an unknown physiological condition. The outputs of these filters are used in a hypothesis testing formulation to determine the identity of the physiological condition represented by the data under test. Online model parameter identification can be carried out as well.

In an embodiment of the invention that provides extraction of features from physiological signals, an inverse filter is used to whiten the component of the signal that is undesired so that the filter residual output contains only white noise in addition to desired feature components of the input signal. Linear and nonlinear filtering as well as other techniques can then be applied to the suppression of the white noise from this residual. Naturally, this embodiment of the invention can also be used for separating a desired signal component from sensor noise and other forms of stochastic and deterministic interference. Because the whitening filters of the present invention whiten the signal both spatially and temporally, improved spatial localization of features is also possible for a suite of spatially-distributed sensors.

The following definitions serve to clarify the disclosed and claimed invention:

Physiological condition refers to a state of normality or specific abnormality associated with a living biological system. In the context of the human body, the state of organic disease, structural form or physical status, or biochemical and metabolic status of tissue such as muscles and bones, and circulatory and other organ systems that can be sensed by some type of invasive or non-invasive sensor suite constitutes a physiological condition.

Truth data refers to examples of physiological sensor signals associated with cases representing known physiological conditions and which are to be used in the creation of model-based filters for the detection of such corresponding physiological conditions in test data.

Test data refers to physiological sensor signal data associated with cases representing unknown physiological conditions and which are to be processed by means of the invention herein disclosed for determination of these physiological conditions.

Sensor suite refers to a collection of sensors used to concurrently collect data from a physiologic source. The sensor suite can comprise a single sensor or multiple sensors and can include a single sensor type or multiple types. Examples of candidate sensor types include electrocardiographic, magnetocardiographic, electroencephalographic, electromyographic, phonoacoustic, ultrasonic, arterial and venous pressure wave, skin impedance, tissue impedance, otoacoustic, blood gas and chemistry, etc.

Feature-absent whitening filter refers to a model-based state variable filter that will whiten signal data that does not contain the specific feature of interest. That is, the output of such a filter given a feature-absent input will be largely white noise. When the input to such a filter is a signal containing the modeled component and an unmodeled feature, the output will be largely white noise and the unmodeled feature.

Statistical metric refers to any of numerous numerical quatities calculated from processed data for use in the generation of a decision regarding said processed data. An example statistical metric is the number of threshold crossings for a temporally-whitened data sequence of specified length.

OBJECTS AND ADVANTAGES

Several objects and advantages of the present invention are:

(a) to provide a method of detecting physiological conditions that is robust to sensor noise;

(b) to provide a method of detecting physiological conditions that exploits cross-channel (or cross-sensor) information;

(c) to provide a method and system of detecting physiological conditions that exploits the efficient representation inherent in state variable models;

(d) to provide a method and system for the robust extraction of features from a physiological signal.

DETAILED DESCRIPTION OF THE INVENTION

Multi-sensor systems can provide improved ability to detect various physiological conditions. This is true whether such systems use sensors of a single type in a spatially-distributed array or whether information is available from sensors of differing types. In fact, detection of some physiological conditions requires the use of multiple sensors. For example, most heart conditions detectable with 12-lead ECGs require concurrent examination of multiple leads. Thus, multichannel methods are well-suited for multi-sensor processing applications such as ECG diagnosis because they handle cross-lead information directly. In model-based methods, a parametric model is fit to data and the model is utilized in a configuration to make decisions on independent data.

In the present invention, a multi-input, multi-output, linear, time-invariant, state variable model (SVM) is generated for each condition. The use of SVMs to model physiological conditions is both attractive and feasible at the present time because recent developments in subspace identification theory have produced algorithms which: (a) process the data in one step (do not involve multiple iterations and the associated convergence issues); (b) can be implemented in a computationally-efficient manner; (c) include built-in model order selection criteria; and (d) can handle the complexity of physiological processes with reasonable model order. In addition, the SVM class includes auto-regressive (AR), moving-average (MA), and auto-regressive moving-average (ARMA) models as sub-classes. A detailed description of a premier algorithm for SVM identification, the canonical correlations (CC) method, is provided below. A collection of other such algorithms, both deterministic and stochastic, are detailed in the following publications by S. Y. Kung, "A New Identification and Model Reduction Algorithm via SVD," Proceedings of the 12th IEEE Asilomar Conference on Circuits, Systems, and Computers, pp. 705–714, 1978, H. Akaike, "Stochastic theory of minimal realization," IEEE Trans Auto Contr, Vol. AC-19, No. 6, December 1974, pp. 667–674, H. Akaike, "Markovian representation of stochastic processes by canonical variables," SIAM J Contr, Vol. 13, No. 1, January 1975, pp. 162–173, U. B. Desai, D. Pal, and R. D. Kirkpatrick, "A realization approach to stochastic model reduction," Int J Contr, Vol. 42, 1985, pp. 821–838, J. R. Román and D. W. Davis, State-Space Models for Multichannel Detection, Technical Report No. RL-TR-93-146, Rome Lab, Rome, N.Y., 1993, P. Van Overschee and B. De Moor, "Subspace Algorithms for the Stochastic Identification Problem," Automatica, Vol. 29, No. 3, 1993, pp. 649–660 and P. Van Overschee and B. De Moor, "Subspace Identification for Linear Systems: Theory—Implementation—Application," Kluwer Academic Publisher, Boston, 1996.

Figure 1:
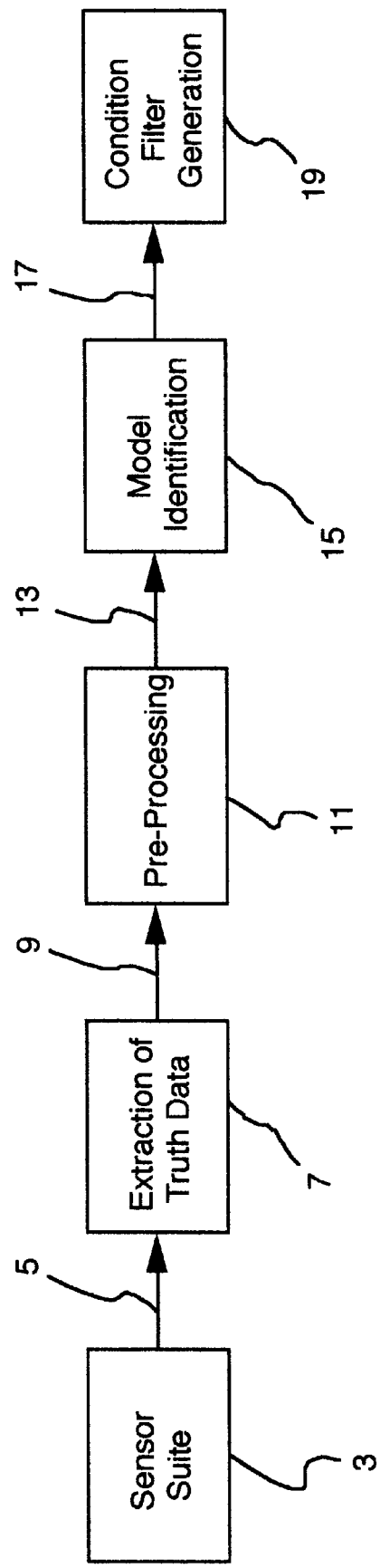
FIG. 1 is functional block diagram of the method for obtaining a state variable model for a physiological process.

FIG. 1 is a functional block diagram depicting the methodology used in the present invention to obtain SVMs to represent various known physiological conditions. Raw data 5 which represents a known physiological condition in the form of a vector sequence is received from a sensor suite 3. Means 7 for extracting data from the sensor suite provides extracted data 9 in a form amenable to processing. This may involve temporary storage or retrieval of data, conversion of the data from analog to digital form, or some other data gathering function. The extracted data 9 is then subject to pre-processing means 11 which provides any necessary data segmentation, trend removal, or normalization. These pre-processing functions may be unnecessary in some applications. The pre-processed data 13 is then input to model identification means 15 in order to generate an SVM that represents the truth data. Such means incorporates the use of one or more of the aforementioned SVM identification algorithms or others. The identified SVM parameters 17 are then used by condition filter generation means 19 to provide a filter that will decorrelate (whiten) data that is representative of the condition that corresponds to the filter.

Figure 2:
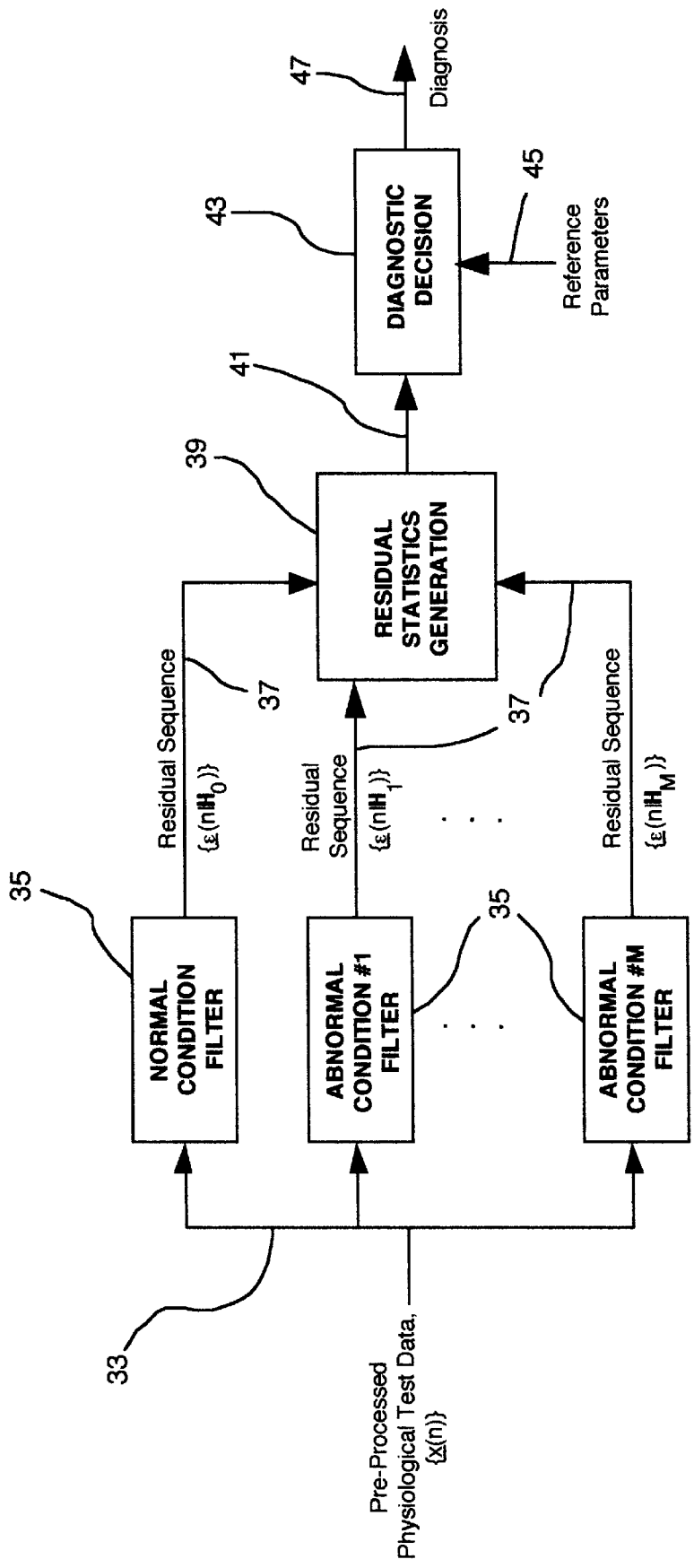
FIG. 2 is a functional block diagram depicting the innovations-based detection hypothesis testing architecture.

FIG. 2 depicts the innovations-based detection (IBD) hypothesis testing architecture of the present invention useful for the determination of physiological conditions represented by test data. An SVM is generated for each condition by the methodology of FIG. 1. The filters in the IBD configuration are actually the model inverses. These filters are inherently stable in the case of the canonical correlations (CC) SVM model identification algorithm because CC models are minimum phase. The pre-processed test data 33 is input to the condition filters 35 in parallel. Residual sequences 37 output from each condition filter 35 are subject to calculation processes 39 that generate statistical measures 41 of the residual sequences 37. The residual sequences 37 will exhibit varying degrees of relative whiteness. The statistical measures 41 are used in concert with reference parameters 45 by diagnostic decision means 43 to ascertain whether data has been sufficiently whitened to assign a diagnosis 47 to the test data.

IBD configurations that exploit model-based methods have been used successfully for radar detection and other applications. Thorough descriptions of IBD schemes in the context of the radar application are provided in the publications by P. A. S. Metford, S. Haykin, "Experimental analysis of an innovations-based detection algorithm for surveillance radar," IEE Procs 1985, 132(Pt F), pp. 18–26, and J. H. Michels, "Multichannel Detection Using the Discrete-Time Model-Based Innovations Approach," Ph. D. dissertation, 1991, EE Dept, Syracuse Univ, Syracuse, N.Y.

The IBD methodology of FIG. 2 has been successfully applied by the inventors to the discrimination of complete right and left bundle branch block (RBBB; LBBB) and normal ECG cases from the Common Standards for Quantitative Electrocardiography (CSE) multi-lead ECG database (J. L. Willems, "Common Standards for Quantitative Electrocardiography—10th and Final Progress Report," CSE Coord Ctr report 1990, Div of Medical Informatics, Univ Hospital Gasthuisberg, Leuven, Belgium). The results of this effort are provided in the publication by J. R. Román, D. W. Davis, J. H. Michels, and V. G. Davila-Román, "Model-Based Multichannel Diagnosis of Cardiac Conduction Abnormalities," Proceedings of the 1996 Computers in Cardiology Conference, Sep. 8–11, 1996, Indianapolis, Ind.

The following sections discuss the sequence of steps used in processing physiological data by means of the disclosed invention. The ECG has been used as an example of application of the methodology of the disclosed invention to a particular multichannel sensor suite. FIG. 2 illustrates an IBD configuration for diagnosis of multiple heart abnormality conditions by processing multiple leads concurrently. This approach is different from rule-based and other conventional methods. The scope of the present invention includes variations of the methodology that attend the application to other sensor types and sensor combinations. For instance, when the sensor suite comprises sensors of different types with different delay characteristics, the pre-processing step may include synchronization of the data from the various sensors. It may also be useful to segment data differently depending on the sensor type.

Pre-Processing

Pre-processing includes such operations as segmentation of the data stream into sequences of interest, removing artifacts such as sensor-induced signal offset (bias) or linear trends as well as some interference and noise effects, and normalization to remove artificial power variation among channels or different sets of data.

In the example of the ECG application, pre-processing includes: (A) segmentation of the ECG trace into cardiac cycles (or segments thereof), (B) amplitude offset, and (C) amplitude scaling. Segmentation can be used to excise specific regions of the cardiac waveform that are of diagnostic interest for certain cardiac conditions. For instance, in the study of bundle branch block cited above, the QRS complex is diagnostically significant. Hence, eight 100-point long QRS segments were excised from each selected lead trace of each selected case file. Since the CSE files are synchronously-recorded and there is no significant different delay among the ECG leads, it suffices to segment one lead and use this lead as reference for the others. The location of the first large peak in the selected lead is identified, and a pre-determined number of points preceding the peak fixes the segment start. After segmentation, an amplitude offset is applied to each QRS segment in each lead to set the so-called "iso-electric" potential to zero. After biasing, amplitude scaling is applied to normalize the segment power to unity. Variations of these operations have been considered, but this procedure prepared the data best for model identification and discrimination. Many of the ECG traces in the CSE database include a linear trend due either to respiration artifact or drift in the sensor electronics. However, often the trend is negligible within a single cycle (or segment thereof).

State-Space Model Identification

The IBD configuration is based on the premise that the J-lead physiological signal (or ECG trace, as an example), $\{x(n) | n=0,1,\ldots,N-1\}$, can be modeled as the J-element vector output of a linear, time-invariant system. Further, each physiological condition of interest requires a distinct set of system parameters. Simulation-based analyses indicate that such is indeed the case. The CC algorithm is highlighted as an algorithm to identify the state-space model for the condition filters because the model parameters are identified in innovations representation (IR) form. As a result, the system inverse is obtained directly, and the model and its inverse are both stable (minimum phase). Also, the IR is in stochastic balanced coordinates, which allows a robust approach for model order selection.

Innovations Representation Form

The IR for a linear, time-invariant, discrete-time, complex-valued, zero-mean stochastic process is of the form given by the following set of vector-matrix equations $$\beta(n+1)=F\beta(n)+K\epsilon(n) \quad n=0,1,\ldots,N-1$$

$$x(n)=H^H\beta(n)+\epsilon(n) \quad n=0,1,\ldots,N-1$$

where $\beta$ is the Q-element state vector, $\epsilon$ is the input vector, x is the output vector, and F, K, and H are the system matrices. Superscript H denotes the conjugate transpose (Hermitian) operator. This assumes that, in general, the data can be complex-valued (including both amplitude and phase information), although many applications (depending on the sensor type) will use real data for which the transpose operator should be used in lieu of the Hermitian operator. The dimension of the state vector, Q, is the system order; also, the state initial condition is zero, and the steady-state covariance matrix of the state is $$\Pi = E[\beta(n)\beta^H(n)]$$

Matrix H is diagonal, with its diagonal elements ranging between zero and unity, and arranged in decreasing order of magnitude along the diagonal (balanced coordinates). The diagonal elements of n are the canonical correlations between the past and future of the process x. The auto-covariance sequence (ACS) of the output is defined as $$\Lambda(m)=\Lambda_m=E[x(n)x^H(n-m)] \quad \forall m$$

Each matrix element of this sequence is related to the model matrix parameters via the following important equations:

$$\Lambda_0 = H^H \Pi H = \Omega$$

$$\Lambda_m = H^H F^{m-1} \Gamma \quad m>0$$

$$\Lambda_m = \Gamma^H [F^{m-1}]^H H = \Gamma^H [F^H]^{m-1} H \quad m<0$$

where $\Omega$ is the covariance matrix of the input process, $$\Omega=E[\epsilon(n)\epsilon^H(n)]=\Lambda_0-H^H\Pi H$$

and $\Gamma$ is the following cross-covariance matrix, $$\Gamma = E[\beta(n)x^H(n-1)] = F\Pi H = K\Omega$$

Matrix K is the Kalman gain matrix, and $\{\epsilon(n)\}$ is a white sequence referred to as the innovations sequence. The output sequence $\{x(n) | n=0,1,\ldots,N-1\}$ represents the multichannel sensor data (In the example of the ECG bundle branch study, this sequence represents the multilead data for the QRS segment of an ECG trace).

Further discussion of the innovations representation and its properties may found in the publication by B. D. O. Anderson and J. B. Moore, "Optimal Filtering," Prentice-Hall, Inc., Englewood Cliffs, N.J., 1979.

Canonical Correlations Algorithm

Model identification with the CC algorithm is based on the correlation structure of the process x as contained in the ACS, $\{\Lambda_m\}$. Define the past and future of the process x as the following L-block-element vectors (with L larger than or equal to the system order), $$\underline{x}_P = [\underline{x}^H(n-1) L \underline{x}^H(n-2) \underline{x}^H(n-L)]^H$$

$$\underline{x}_F = [\underline{x}^H(n) L \underline{x}^H(n+1) \underline{x}^H(n+L-1)]^H$$

Consider now the following block cross-covariance matrix, $$H_L = E[\underline{x}_F \underline{x}_P^H] = \begin{bmatrix} \Lambda_1 & \Lambda_2 & L & \Lambda_L \\ \Lambda_2 & \Lambda_3 & L & \Lambda_{L+1} \\ \uparrow & \uparrow & O & \uparrow \\ \Lambda_L & \Lambda_{L+1} & L & \Lambda_{2L-1} \end{bmatrix}$$

This matrix has block Hankel structure, and is referred to as a block Hankel matrix of size L. The correlation structure between the past and future of the process is contained in $H_L$.

It follows from the above equations for $\Lambda_m$ and the equation for $H_L$ immediately above that $$H_L = \begin{bmatrix} H^H \\ H^H F \\ \uparrow \\ H^H F^{L-1} \end{bmatrix} [\,\Gamma \quad F\Gamma \quad L \quad F^{L-1}\Gamma\,] = O_L D_L^H$$

Now define a column-shifted (row-shifted) Hankel matrix as $$Z[H_L] = \begin{bmatrix} \Lambda_2 & \Lambda_3 & L & \Lambda_{L+1} \\ \Lambda_3 & \Lambda_4 & L & \Lambda_{L+2} \\ \uparrow & \uparrow & O & \uparrow \\ \Lambda_{L+1} & \Lambda_{L+2} & L & \Lambda_{2L} \end{bmatrix} = O_L F D_L^H$$

Notice that any factorization of $H_L$ into two JLxQ matrices $O_L$ and $D_L$ generates system matrix parameters H and $\Gamma$. Applying the same transformations to the column-shifted block Hankel matrix generates the system matrix, F. The desired factorization, however, is the one in which the system parameters are in a basis corresponding to the IR form. In that basis, the state covariance matrix, $\Pi$, is diagonal, its diagonal elements have value between 0 and 1, and are arranged in decreasing order of magnitude along the diagonal. The transformations that lead to the desired factorization of the Hankel matrix are obtained by exploiting the correlation structure of the process. Let $R_P$ and $R_F$ denote the JLxJL past and future block correlation matrices, respectively. That is, $$R_P = E[\underline{x}_P \underline{x}_P^H] = \begin{bmatrix} \Lambda_0 & \Lambda_1 & L & \Lambda_{L-1} \\ \Lambda_{-1} & \Lambda_0 & L & \Lambda_{L-2} \\ \uparrow & \uparrow & O & \uparrow \\ \Lambda_{1-L} & \Lambda_{2-L} & L & \Lambda_0 \end{bmatrix}$$

$$R_F = E[\underline{x}_F \underline{x}_F^H] = \begin{bmatrix} \Lambda_0 & \Lambda_{-1} & L & \Lambda_{1-L} \\ \Lambda_{-1} & \Lambda_0 & L & \Lambda_{2-L} \\ \uparrow & \uparrow & O & \uparrow \\ \Lambda_{L-1} & \Lambda_{L-2} & L & \Lambda_0 \end{bmatrix}$$

Using these matrices a variance-normalized Hankel (block cross-covariance) matrix is generated as $$R = R_F^{-1/2} H_L R_P^{-1/2} = E[R_F^{-1/2} \underline{x}_F \underline{x}_P^H R_P^{-1/2}]$$

Now carry out a singular value decomposition (SVD) on R to obtain $$R = U_R S_R V_R^H$$

where $U_R$ and $V_R$ are JLxJL unitary matrices, and $S_R$ is a JLxJL diagonal matrix of the form $$S_R = \begin{bmatrix} \Pi & [0] \\ [0] & [0] \end{bmatrix}$$

It follows from the above equations for R that $$S_R = T_F H_L T_P^H$$

where the JLxJL transformation matrices $T_P$ and $T_F$ are given as $$T_P = V_R^H R_P^{-1/2}$$

$$T_F = U_R^H R_F^{-1/2}$$

Given these definitions, it also follows that the JLxQ matrices $O_L$ and $D_L$ are obtained as $$O_L = T_F^{-1} \begin{bmatrix} \Pi^{1/2} \\ [0] \end{bmatrix}$$

$$D_L = T_P^{-1} \begin{bmatrix} \Pi^{1/2} \\ [0] \end{bmatrix}$$

The transformation matrices can be generated using robust numerical algorithms, such as the SVD, applied to the past and future block correlation matrices.

The remaining system model parameters, $\Omega$ and K, are generated using the above equations for $\Lambda_0$ and $\Gamma$, respectively, provided $\Lambda_0$ is known. In practical situations the true ACS is unavailable, so an estimate is used. The biased, time-average estimate is preferred over the unbiased, time-average one.

Model Order Determination

The CC algorithm has a built-in criterion for model order determination. As indicated before, in the CC IR representation the state covariance matrix has the CCs along its diagonal. In the cases where the true covariance matrix sequence is unknown and an estimate is used, the Hankel matrix is diagonalized as in the equation for $S_R$ above, but all diagonal values are non-zero. This also occurs when the data to be modeled arises from a process different from a SVM. For both of these conditions, however, the values of the CCs provide an indication of model order.

A useful model order criterion is based on mutual information (H. Akaike, "Markovian representation of stochastic processes by canonical variables," SIAM J Contr, Vol. 13, No. 1, January 1975, pp. 162–173). The mutual information between the past and future of a process is defined as $$\eta = -\frac{1}{2} \sum_{m=1}^{JL} \ln[1 - \rho_m^2]$$

where $\rho_m$ is the mth CC. Then, the normalized mutual information parameter for an ith-order model is defined as $$\eta = \frac{1}{2\eta} \sum_{m=1}^{i} \ln[1 - \rho_m^2]$$

The value of this parameter represents the fraction of the mutual information in the past about the future that is retained by the state in an ith-order IR representation of the channel output process $\{x(n)\}$. This parameter is evaluated as a function of the index i, and the model order is the index value at which the parameter exceeds a pre-selected threshold. Often the plot of the normalized mutual information parameter as a function of model order is a curve that exhibits a knee that can be used in lieu of a pre-selected threshold. The model order corresponding to the pre-selected threshold or the knee of the curve is then used to establish the number of nonzero diagonal entries to be retained in matrix $S_R$ above.

Condition (Whitening) Filters and Residuals

Given an IR system as defined by the equation set above, the inverse system is obtained via a simple linear transformation of that equation set; that is, $$\beta(n+1) = [F - KH^H]\beta(n) + Kx(n) \quad n = 0, 1, \ldots, N-1$$

$$\epsilon(n) = -H^H \beta(n) + x(n) \quad n=0,1,\ldots,N-1$$

Notice that the input and output roles are reversed with respect to the original IR system. The system represented by the equations immediately above is a whitening filter for the process x: if the input sequence to system is a realization of the process modeled by the original system, then the output sequence $\{\epsilon(n)\}$ is white (uncorrelated in time). Achievement of temporal whitening in each of the channels of the system is usually sufficient to determine a specific abnormality.

As depicted in FIG. 2, a filter 35 is designed for each abnormality condition to be diagnosed. And $\{\epsilon(n|H_i)\}$ denotes the ith condition filter output, or ith residual, which is white only when the input matches the filter type (the residual is then an innovations sequence). In all cases, however, the residual is Gaussian-distributed (the noise in the ECG trace is Gaussian-distributed).

In certain applications it may be desirable to achieve decorrelation from channel to channel, as well. Full whitening (spatial and temporal) is attained with a linear transformation. Let $C^H$ denote a JXJ matrix operating on the temporal innovations to generate the spatio-temporal innovations, $\{n(n)\}$, with diagonal covariance; that is, $$v(n) = C^H \epsilon(n)$$

If $C^H$ is the inverse of the lower-triangular matrix in the LU decomposition of $\Omega$, then the rows of $C^H$ represent optimal linear filters of successively higher orders. In fact, the last (Jth) row of $C^H$ are the coefficients of the highest-order linear predictor that can be defined for a sequence of length J. Therefore, these elements can be viewed as the J spatial weights that remove the residual spatial correlation from the temporal innovations as discussed in the publication by C. W. Therrien, "On the relation between triangular matrix decomposition and linear prediction," IEEE Procs, Vol. 71, No. 12, December 1983, pp. 1459–1460. With this interpretation, the frequency response of these weights (obtained by the discrete Fourier transform of the sequence of weights) provides the spatial cancelation pattern of the spatial filter. For an array of equally-spaced sensors, the spatial cancellation pattern can provide information regarding the angle-of-arrival of physiological signals. In the situation where features in the sensor data are due to a physically-localized process, such angle-of-arrival information may be of use in locating the physical coordinates of the physiological process associated with the given condition filter.

Decision Statistics and Criteria

Physiological condition discrimination can be formulated as a hypothesis testing problem, with multiple, composite hypotheses. The normal condition is the null hypothesis, $H_0$, and each abnormality considered is an alternative hypothesis, $H_i$, i=1, . . . ,M. Under idealized conditions (the process is stationary, ergodic, and is the output of a state space system), discrimination in a multiple hypotheses problem is accomplished using a comparative value test applied to the log-likelihood (LL) statistic as discussed in the publications by J. H. Michels, "Multichannel Detection Using the Discrete-Time Model-Based Innovations Approach," Ph.D. dissertation 1991, EE Dept, Syracuse Univ, Syracuse, N.Y. and M. D. Srinath, P. K. Rajasekaran, "An Introduction to Statistical Signal Processing With Applications," J Wiley & Sons, 1979, New York, N.Y., which is a function of the filter residual. But many physiological signals such as the ECG are non-ergodic, and their state space models are representation models rather than physical models; thus, the residual may be non-white even in cases where the input matches the filter type. This is common to all applications involving real data. However, the residual sequence of the condition filter that matches the input physiological condition is "more white" (less colored) than the residual sequences of the non-matching condition filters. Thus, the LL statistic utilized in multiple hypotheses tests for Gaussian processes is inadequate for robust (>90% correct) diagnoses of ECG traces, for example, but does provide correct diagnoses in a majority of cases. Other approaches can be used to implement the diagnostic decision, including tests of whiteness. A set of statistical measures can be used. By itself, each separate statistical measure may be inadequate for robust diagnoses, but provides a good indication of whiteness (or lack thereof). Under such circumstances, an m-of-n decision rule can be implemented to achieve a joint decision.

The following is an example of combining statistical measures to achieve a joint decision. This approach has also been applied in the ECG study cited above: Let D(●) denote the diagnosis decision based on statistic (●), and D denote the final diagnosis decision, based on the two-out-of-three criterion applied to the three individual decisions. The selected measures are listed next, including the formula used to generate the relevant statistic as well as the associated decision rule.

Log-Likelihood (LL) Statistic:

$$l(\varepsilon | H_i) = N\ln[|\Omega(H_i)|] + \sum_{n=0}^{N-1} \varepsilon^T(n | H_i)\Omega^{-1}(H_i)\varepsilon(n | H_i)$$

LL Decision Rule:

$$D(l) = H_i \Leftrightarrow l(\varepsilon | H_i) = \min_j [l(\varepsilon | H_j)]$$

Threshold Crossings (TC) Statictic:

$$C_r(\varepsilon | H_i) = \sum_{k=1}^{J} \sum_{m=1}^{M_c} \max\{0, \text{sgn}[|\hat{r}_{kk}(m)| - \tau_r(\alpha)]\}$$

$$\tau_r(\alpha) = \sqrt{\frac{2}{N}} \text{ erf}^{-1}[1-\alpha] = 0.196$$

TC Decision Rule:

$$D(C) = H_i \Leftrightarrow C_r(\varepsilon | H_i) = \min_j [C_r(\varepsilon | H_j)]$$

Rectified ACS Sum (RAS) Statistic:

$$S_r(\varepsilon | H_i) = \sum_{k=1}^{J} \sum_{m=1}^{M_c} |\hat{r}_{kk}(m)|$$

RAS Decision Rule:

$$D(S) = H_i \Leftrightarrow S_r(\varepsilon | H_i) = \min_j [S_r(\varepsilon | H_j)]$$

Two-Out-Of-Three Decision Rule:

$$D = H_i \quad \text{if} \quad D(l) = D(C) = D(S) = H_i$$
$$\text{or} \quad D(l) = D(C) = H_i$$
$$\text{or} \quad D(l) = D(S) = H_i$$
$$\text{or} \quad D(C) = D(S) = H_i$$
$$D = \emptyset \quad \text{if} \quad D(l) = D(C) = D(S)$$

The TC and RAS statistics are functions of the circular, time-average auto-correlation sequence (ACS) estimate of each one of the J scalar elements of the residual vector, $\{\hat{r}_{kk}(m) | k=1, \ldots, J; m=0, \ldots, M_c\}$. $M_c$ is the maximum unique lag of the circular ACS estimate, and $\alpha$ is the level of significance for the threshold test. The circular ACS estimator is preferred for whiteness tests, and the ACS is normalized to unity at lag m=0. For large N, lags 1 through $M_c$ are approximately Gaussian-distributed.

Other statistical measures and ways of fusing the information from them to form decisions such as Bayes method and Dempster-Shafer techniques (E. J. Maudler and J. Schurmann, "Combining the classification results of independent classifiers based on the Dempster/Shafer theory of evidence," Pattern Recognition and Artificial Intelligence, Vol. 10, pp. 381–393, 1988) are within the scope of the present invention.

Feature Extraction

Figure 3:
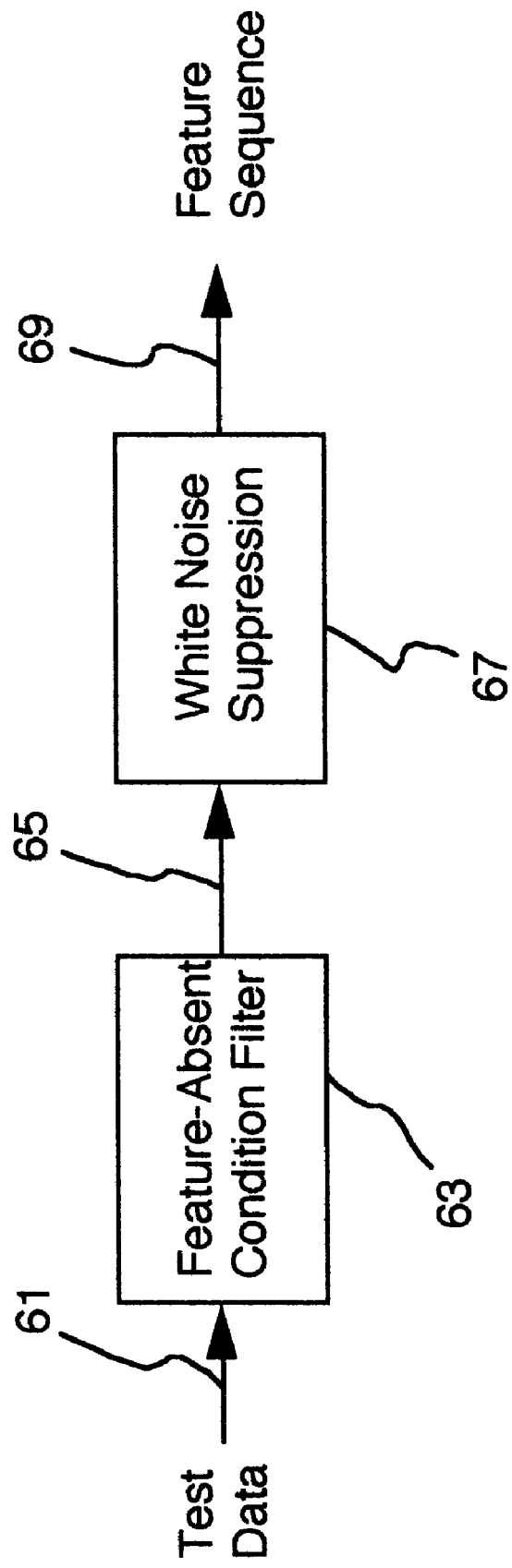
FIG. 3 is functional block diagram depicting a method for signal feature extraction.

It is possible to perform a signal separation function with another embodiment of the present invention. The process depicted in FIG. 3 is useful for extracting known or unknown features from a physiological signal. First, a feature-absent condition filter must be generated for truth data in which the feature is known to be absent using the methodology described above. Then, the feature-containing test data 61 which has been pre-processed as necessary is introduced to the feature-absent condition filter 63. The feature-absent condition filter will nominally whiten all input signal energy except the unmodeled feature component so that the filter residual output 65 will comprise largely white noise and the feature. The white noise is removed from the residual 65 by means 67 to produce an output sequence 69 substantially containing only the feature. Various methods, well known in the prior art, can be implemented to effect the white noise removal means 67. These include conventional linear spectral filtering as well as nonlinear filtering approaches such as median filtering (L. Alparone, S. Baronti, and R. Carlá, "Two-Dimensional Rank-Conditioned Median Filter," IEEE Trans. on Circuits and Systems—II: Analog and Digital Signal Processing, Vol. 42, No. 2, February, pp. 130–132).

We claim:

1. A method of extracting features from multichannel test data, said test data obtained from a physiological sensor suite, said method comprising the steps of:

(a) extracting feature-absent truth data containing physiological information from said sensor suite;

(b) pre-processing said feature-absent truth data;

(c) further processing said pre-processed data to obtain the parameters of a multichannel model to represent a feature-absent condition associated with said pre-processed data;

(d) forming a feature-absent whitening filter using said parameters of said multichannel model;

(e) extracting said test data containing physiological information from said sensor suite;

(f) pre-processing said test data; and (g) processing said pre-processed test data with said feature-absent whitening filter to produce an output residual largely containing only white noise and a feature of interest.

2. A method as recited in claim 1, wherein said features are cardiac features.

3. A method as recited in claim 1 wherein said multichannel model is selected from the group consisting of state variable, auto-regressive, moving average, and auto-regressive moving average models.

4. A method as recited in claim 1 further comprising a final step of further processing said output residual to diminish said white noise and thereby produce a signal largely containing only said feature of interest.

5. A method as recited in claim 1, wherein pre-processing of said feature-absent truth data and said multichannel test data includes the steps of segmentation, trend removal, and normalization of said multichannel test data.

6. A system for extracting features in multichannel test data from a physiological sensor suite, said system comprising:

(a) means for extracting feature-absent truth data containing physiological information from said sensor suite;

(b) means for pre-processing said feature-absent truth data;

(c) means for further processing said pre-processed data to obtain the parameters of a multichannel model to represent a feature-absent condition associated with said pre-processed data, (d) means for forming a feature-absent whitening filter using said parameters of multichannel model;

(e) means for extracting said multichannel test data containing physiological information from said sensor suite;

(f) means for pre-processing said multichannel test data; and (g) means for processing said pre-processed multichannel test data with said feature-absent whitening filter to produce an output residual largely containing only white noise and a feature of interest.

7. A system as recited in claim 6 wherein said multichannel model is selected from the group consisting of state variable, auto-regressive, moving average, and auto-regressive moving average models.

8. A system as recited in claim 6 further comprising means for further processing said output residual to diminish said white noise and thereby produce a signal largely containing only said feature of interest.

9. A system as recited in claim 6 including annunciation means for informing users of said system of said features extracted from said multichannel test data.

10. A system as recited in claim 6 which includes data storage means for storage of said truth data, said multichannel test data, and said features extracted from said multichannel test data.

* * * * *